(12) United States Patent
Kim

(10) Patent No.: US 11,772,704 B2
(45) Date of Patent: Oct. 3, 2023

(54) FRONT BODY STRUCTURE

(71) Applicants: Hyundai Motor Company, Seoul (KR); Kia Corporation, Seoul (KR)

(72) Inventor: Eonpyo Kim, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 129 days.

(21) Appl. No.: 17/460,956

(22) Filed: Aug. 30, 2021

(65) Prior Publication Data
US 2022/0266910 A1   Aug. 25, 2022

(30) Foreign Application Priority Data

Feb. 25, 2021   (KR) .................. 10-2021-0025320

(51) Int. Cl.
| | | |
|---|---|---|
| *B62D 21/15* | (2006.01) | |
| *B62D 21/02* | (2006.01) | |
| *B62D 25/08* | (2006.01) | |
| *B62D 25/20* | (2006.01) | |
| *B60R 19/24* | (2006.01) | |
| *B60R 19/34* | (2006.01) | |

(52) U.S. Cl.
CPC ............ *B62D 21/152* (2013.01); *B60R 19/34* (2013.01); *B60R 19/24* (2013.01); *B62D 21/02* (2013.01); *B62D 21/15* (2013.01); *B62D 25/082* (2013.01); *B62D 25/2018* (2013.01)

(58) Field of Classification Search
CPC ........ B62D 21/00; B62D 21/02; B62D 21/15; B62D 21/152; B62D 25/08; B62D 25/082; B62D 25/085; B62D 25/20; B62D 25/2009; B62D 25/2018; B60R 19/02; B60R 19/24; B60R 19/26; B60R 19/34; B60R 2019/1886
USPC .............. 296/203.01, 203.02, 187.09, 187.1, 296/193.09; 293/132, 133, 155
See application file for complete search history.

(56) References Cited

U.S. PATENT DOCUMENTS

| | | | | |
|---|---|---|---|---|
| 1,307,056 | A * | 6/1919 | Lerderer ................. | B60R 19/28 267/195 |
| 8,002,338 | B2 * | 8/2011 | Yasuhara .............. | B62D 21/152 296/203.02 |
| 10,266,208 | B2 * | 4/2019 | Kang ..................... | B62D 27/02 |
| 2016/0107695 | A1 * | 4/2016 | Lee ....................... | B62D 25/082 296/187.1 |
| 2016/0207573 | A1 * | 7/2016 | Kitakata ................. | B60R 19/12 |
| 2018/0170437 | A1 * | 6/2018 | Park ...................... | B62D 25/082 |
| 2019/0047632 | A1 * | 2/2019 | Kim ....................... | B60G 13/003 |

* cited by examiner

*Primary Examiner* — Dennis H Pedder
*Assistant Examiner* — Joyce Eileen Hill
(74) *Attorney, Agent, or Firm* — Fox Rothschild LLP

(57) ABSTRACT

A front vehicle body structure includes a front mounting bracket and a front side upper member that is connected to the front mounting bracket. The front side upper member includes an upper member upper surface that is inclined upward and rearward of the vehicle body. A front flange is formed downward from the upper member upper surface and is connected to the front mounting bracket.

13 Claims, 11 Drawing Sheets

FRONT BODY STRUCTURE

CROSS-REFERENCE TO RELATED APPLICATION

This application claims priority to and the benefit of Korean Patent Application No. 10-2021-0025320 filed on Feb. 25, 2021, the entire contents of which are incorporated herein by reference.

BACKGROUND

(a) Field of the Disclosure

The present disclosure relates to a front vehicle body structure, and more particularly, to a front vehicle body structure in which collision load is easily distributed by securing the height direction length of the front side upper member.

(b) Description of the Related Art

In a typical FEM (Front End Module) mounting bracket, a welding flange for spot welding is formed outside the side upper member cross-section. However, if the welding flange is formed inside the front side upper member, a welding part is formed in the closed section, and the welding gun cannot enter during spot welding, and thus, the vehicle body height direction length of the front side upper member is relatively small. In addition, a plurality of inflection points are generated in the lateral direction profile of the front side upper member, which causes concentration of impact loads at the plurality of inflection points during collision, and has a limit in efficiently transferring impact energy.

The above information disclosed in this section is only for enhancement of understanding of the background of the disclosure, and therefore it may contain information that does not form the prior art that is already known in this country to a person of ordinary skill in the art.

SUMMARY

The present disclosure has been made in an effort to provide a front vehicle body structure that facilitates distribution of the crash load by securing the height direction length of the front side upper member.

A front vehicle body structure according to an exemplary embodiment of the present disclosure may include a front mounting bracket, and a front side upper member connected to the front mounting bracket, wherein the front side upper member includes an upper member upper surface inclined upward and rearward of the vehicle body, and a front flange formed downward from the upper member upper surface and connected to the front mounting bracket.

A front mounting bracket upper bolt hole may be formed in the upper part of the front mounting bracket, and a front flange upper bolt hole corresponding to the front mounting bracket upper bolt hole may be formed on the front flange. The front vehicle body structure according to an exemplary embodiment of the present disclosure may further include a front side member connected to the front mounting bracket, and a front side member bracket connecting the front mounting bracket, the front side member and the front side upper member.

The front side member bracket may include an upper bracket that connects the front mounting bracket and the front side member. The upper bracket may include an upper bracket upper surface formed in the vehicle body length direction, and an upper bracket lower surface formed under the upper bracket upper surface in the vehicle body length direction.

The front vehicle body structure according to an exemplary embodiment of the present disclosure may further include a crash box mounted on the front of the front mounting bracket, wherein the upper bracket upper surface and the upper bracket lower surface may be provided adjacent to the upper and lower mount positions of the crash box. The upper bracket may further include an upper bracket upper front flange curved upwardly from the upper bracket upper surface to engage the front mounting bracket and the front flange.

An upper bracket upper front flange bolt hole corresponding to the front mounting bracket upper bolt hole and the front flange upper bolt hole may be formed to the upper bracket upper front flange. The upper bracket may further include an upper bracket lower flange that is curved downward from the upper bracket lower surface and connected to the front mounting bracket.

A front mounting bracket lower bolt hole may be formed in the lower part of the front mounting bracket, and wherein the upper bracket lower flange may be connected to the front mounting bracket adjacent the front mounting bracket lower bolt hole. A welding hole may be formed on the upper bracket upper surface and the upper bracket lower surface, respectively.

A mounting bracket welding hole that communicates with the welding holes of the upper bracket may be formed to the front mounting bracket. The front side member bracket may further include a lower bracket connected to the front mounting bracket and lower part of the upper bracket. The front vehicle body structure according to an exemplary embodiment of the present disclosure may further include a lower bracket bulk head mounted inside the lower bracket and the front mounting bracket.

The front side upper member may include a front side upper inner member connected to the rear of the front mounting bracket and connected to the upper surface of the upper bracket, and a front side upper outer member connected to the front mounting bracket, surrounding the upper bracket, and coupled to the front side upper inner member. The front side upper member may include a front side upper inner member upper flange formed extending from the front side upper inner member to the upper part, and a front side upper outer member upper flange that extends from the front side upper outer member to the upper portion and coupled to the front side upper inner member upper flange. The front side upper member may further include a connection member connecting the front side upper outer member and the upper bracket.

According to the front vehicle body structure according to an exemplary embodiment of the present disclosure, the collision load distribution performance may be improved by securing the height direction length of the front side upper member. According to the front vehicle body structure according to an exemplary embodiment of the present disclosure, it may be possible to relatively reduce the number of inflection points formed in the lateral direction profile of the front side upper member, so that the dispersion of the collision energy is possible.

In addition, the effects obtainable or predicted by the embodiments of the present disclosure are to be disclosed directly or implicitly in the detailed description of the embodiments of the present disclosure. In other words, various effects predicted according to an embodiment of the present disclosure will be disclosed in the detailed description to be described later.

BRIEF DESCRIPTION OF THE DRAWINGS

These drawings are for reference in explaining an exemplary embodiment of the present disclosure, and the technical idea of the present disclosure should not be construed as being limited to the accompanying drawings.

DESCRIPTION OF SYMBOLS

Figure 1:
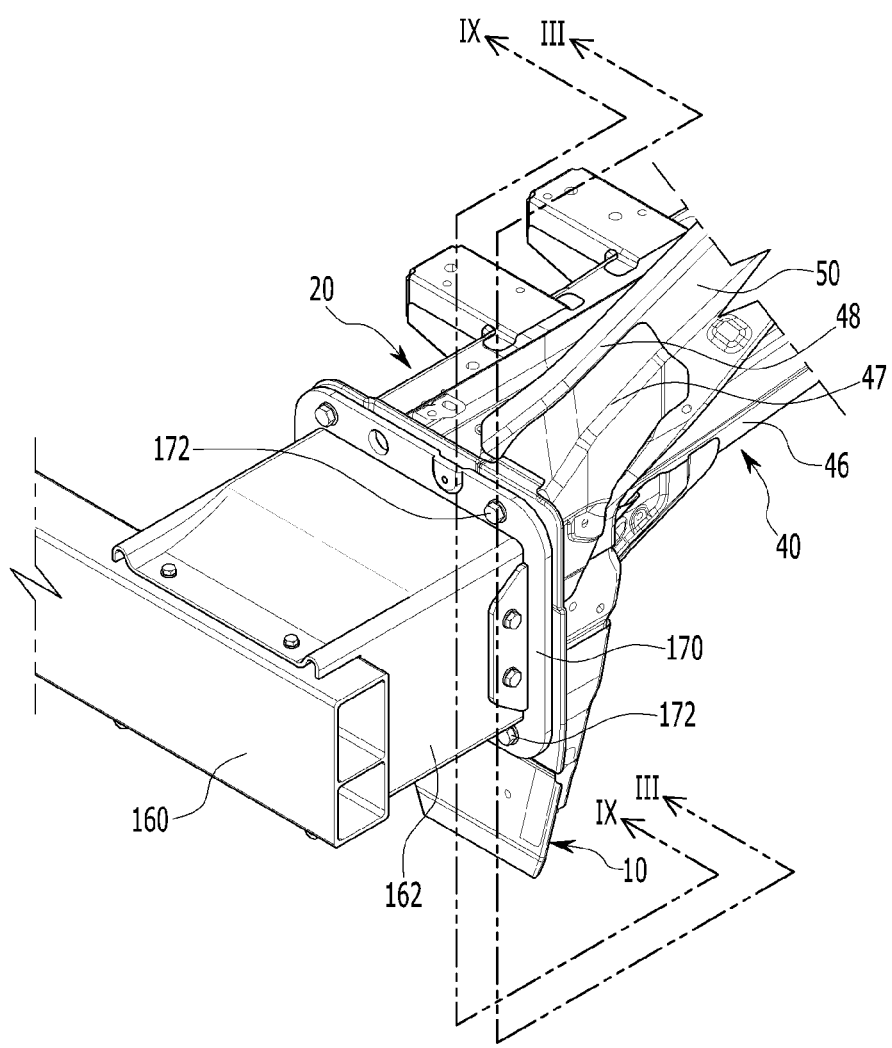
FIG. 1 is a perspective view viewed from front side of a front vehicle body structure according to an exemplary embodiment of the present disclosure.

10: front mounting bracket
12: front mounting bracket welding hole
14: front mounting bracket protrusion
16: front mounting bracket upper bolt hole
18: front mounting bracket lower bolt hole
20: front side member
22: front side member first unit
24: front side member inner body
26: inner body upper flange
28: inner body lower flange
32: front side member second unit
34: front side member outer body
36: outer body upper flange
38: outer body lower flange
40: front side upper member
42: front side upper inner member
44: front side upper inner member upper flange
46: front side upper outer member
47: connection member
48: front side upper outer member upper flange
50: upper member upper surface
52: front flange
54: front flange upper bolt hole
60: front side member bracket
62: rear portion
64: rear stepped portion
66: rear flange
70: upper bracket
72: upper bracket side surface
74: upper bracket side flange
76: side surface stepped portion
80: upper bracket upper surface
82: welding hole
84: upper bracket upper flange
85: upper bracket upper front flange
87: upper bracket upper front flange bolt hole
90: upper bracket lower surface
92: upper bracket lower flange
94: welding hole
100: lower bracket
110: lower bracket side surface
112: lower bracket front flange
114: lower bracket rear surface
116: lower bracket rear flange;
120: lower bracket bulk head
130: front side bulk head
140; sub frame mounting rear reinforcement
142: sub frame mounting bolt
150: wheel guard
160: bumper beam
162: crash box
170: bumper beam mounting bracket
172: bracket bolt
180: welding gun

DETAILED DESCRIPTION

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In order to clearly explain the present disclosure, parts irrelevant to the description are omitted, and the same reference numerals are assigned to the same or similar elements throughout the specification. The size and thickness of each component shown in the drawings are arbitrarily indicated for convenience of explanation, and the present disclosure is not necessarily limited to the bar shown in the drawings, and the thickness is enlarged to clearly express various parts and regions. In addition, in the following detailed description, the names of the components are divided into first, second, etc., in order to classify the components in the same relationship, and the order is not necessarily limited in the following description.

Throughout the specification, when a part includes a certain component, it means that other components may be further included, rather than excluding other components, unless otherwise stated. In addition, terms such as . . . part, . . . means described in the specification mean a unit of a comprehensive configuration that performs at least one function or operation.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

When a part, such as a layer, film, region, plate, etc., is "on" another part, it includes not only the case where it is directly above the other part, but also the case where there is another part in between. In contrast, when an element is referred to as being "directly on" another element, there are no intervening elements present.

An exemplary embodiment of the present disclosure will hereinafter be described in detail with reference to the accompanying drawings. FIG. 1 is a perspective view viewed from front side of a front vehicle body structure according to an exemplary embodiment of the present disclosure, and FIG. 2 is an exploded perspective view of the front vehicle body structure according to an exemplary embodiment of the present disclosure.

Figure 2:
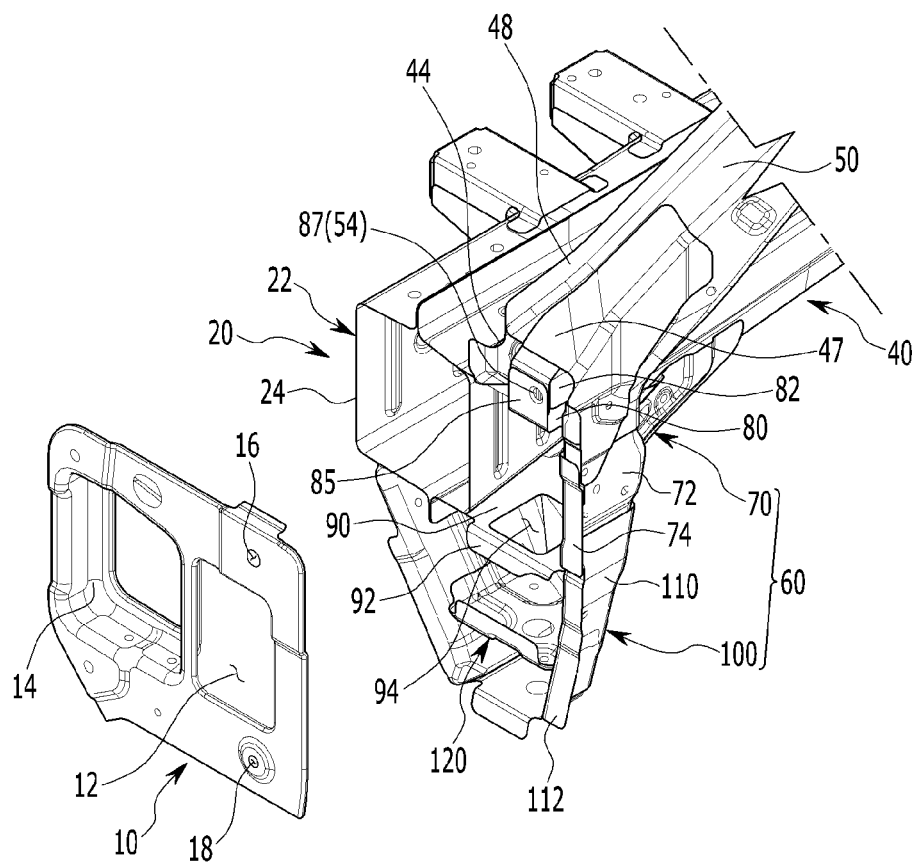
FIG. 2 is an exploded perspective view of the front vehicle body structure according to an exemplary embodiment of the present disclosure.

Referring to FIG. 1 and FIG. 2, a front vehicle body structure according to an exemplary embodiment of the present disclosure may include a front mounting bracket 10 and a front side upper member 40 connected to the front mounting bracket 10. In addition, the front vehicle body structure according to an exemplary embodiment of the present disclosure may include a front side member 20 connected to the front mounting bracket 10. A bumper beam mounting bracket 170 may be mounted in front of the front mounting bracket 10, a bumper beam 160 may be mounted in front of the vehicle body, and a crash box 162 may be mounted between the bumper beam 160 and the bumper beam mounting bracket 170.

Figure 3:
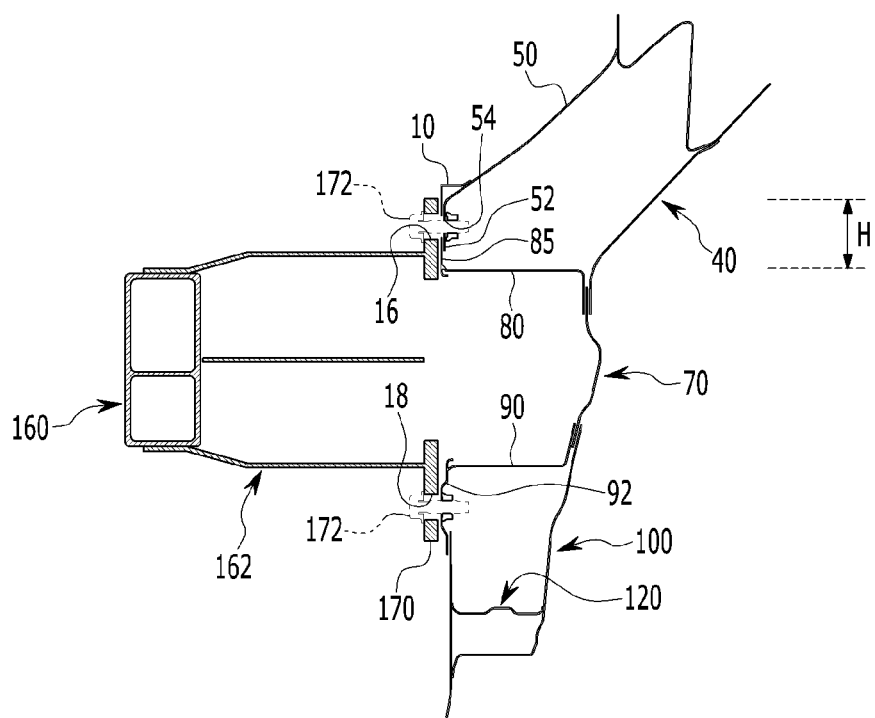
FIG. 3 is a cross-sectional view along the line in FIG. 1.

FIG. 3 is a cross-sectional view along the line III-III in FIG. 1. Referring to FIG. 1 to FIG. 3, the front side upper member 40 may include an upper member upper surface 50 inclined upward and rearward of the vehicle body and a front flange 52 downwardly curved from the upper member upper surface 50 and connected to the front mounting bracket 10. A front mounting bracket upper bolt hole 16 may be formed in the upper part of the front mounting bracket 10, and a front flange upper bolt hole 54 corresponding to the front mounting bracket upper bolt hole 16 is formed in the front flange 52.

Figure 4:
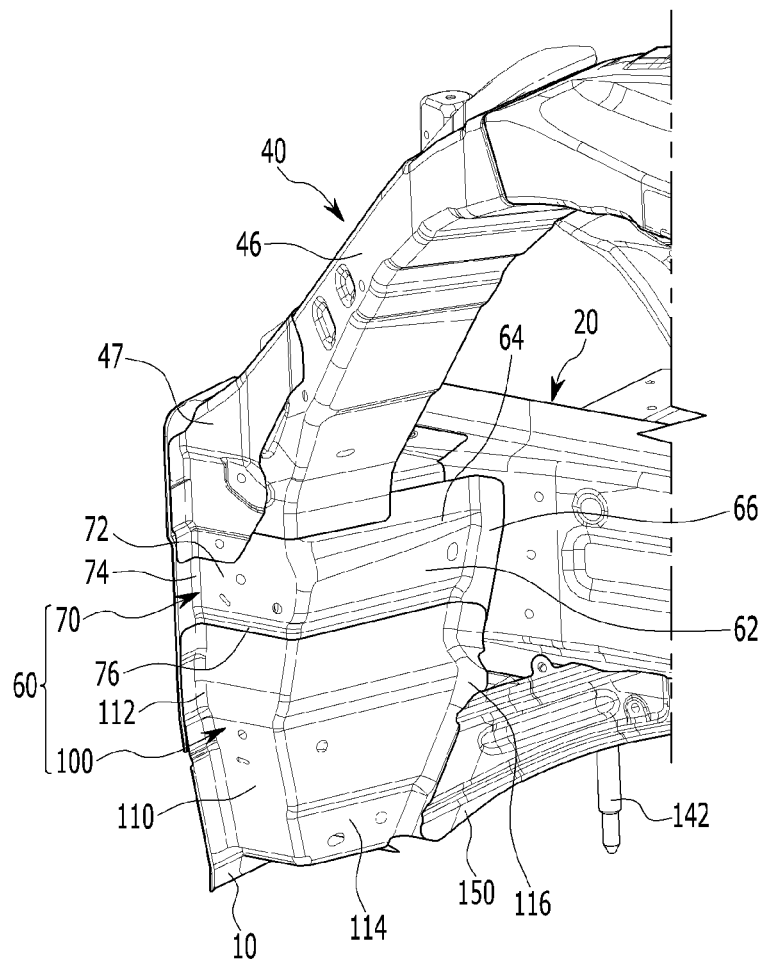
FIG. 4 is a perspective view of a front vehicle body structure according to an embodiment of the present disclosure.

FIG. 4 is a perspective view of a front vehicle body structure according to an embodiment of the present disclosure. Referring to FIG. 1 to FIG. 4, the front vehicle body structure according to an exemplary embodiment of the present disclosure may further include a front side member bracket 60 that connects the front mounting bracket 10, the front side member 20 and the front side upper member 40. The front side member bracket 60 may include an upper bracket 70 that connects the front mounting bracket 10 and the front side member 20.

Figure 5:
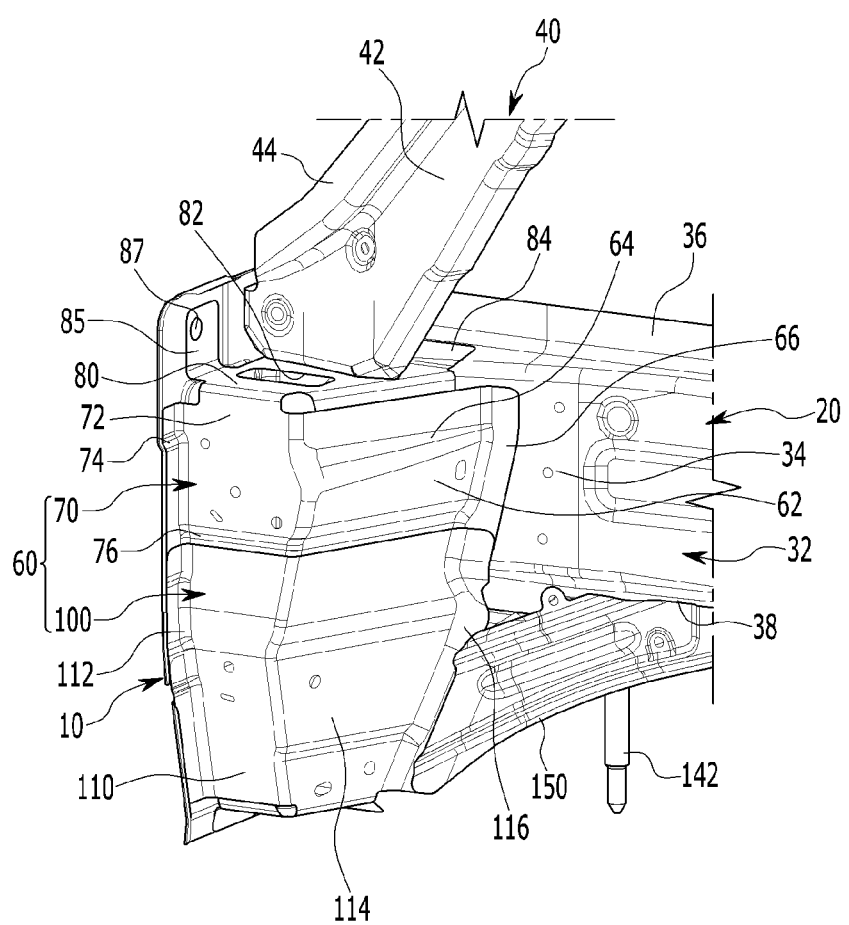
FIG. 5 is a partial perspective view viewed from rear side of a front vehicle body structure according to an exemplary embodiment of the present disclosure excluding a front side upper outer member.
Figure 6:
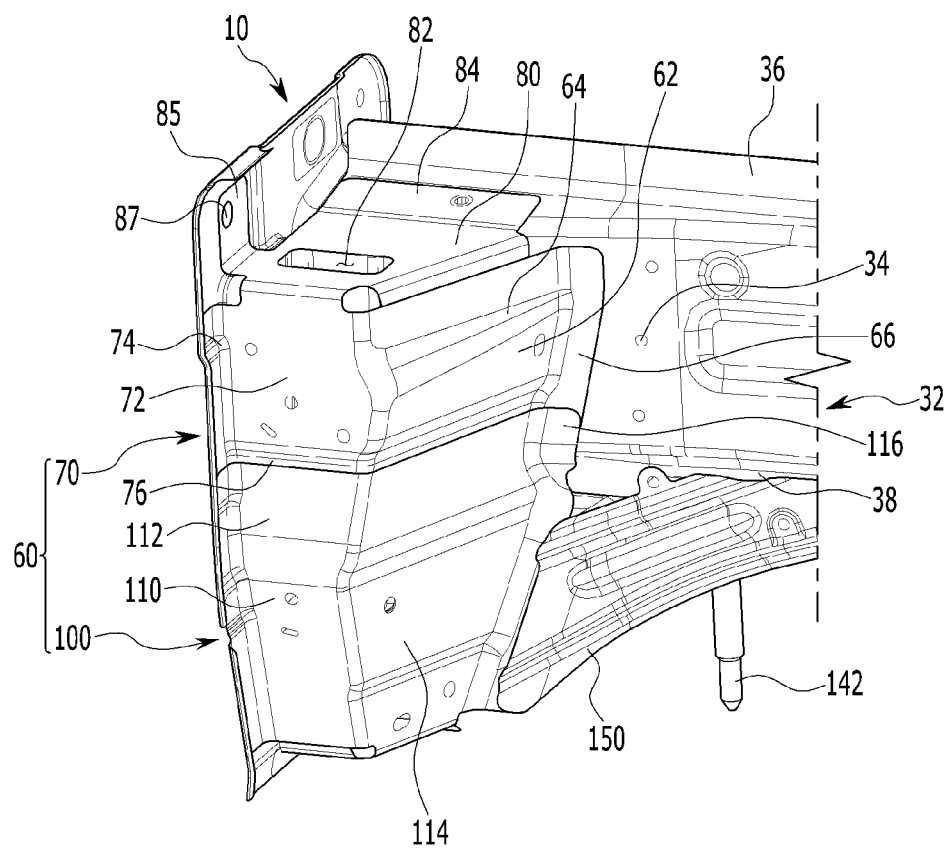
FIG. 6 is a partial perspective view in FIG. 5 excluding a front side upper inner member.
Figure 7:
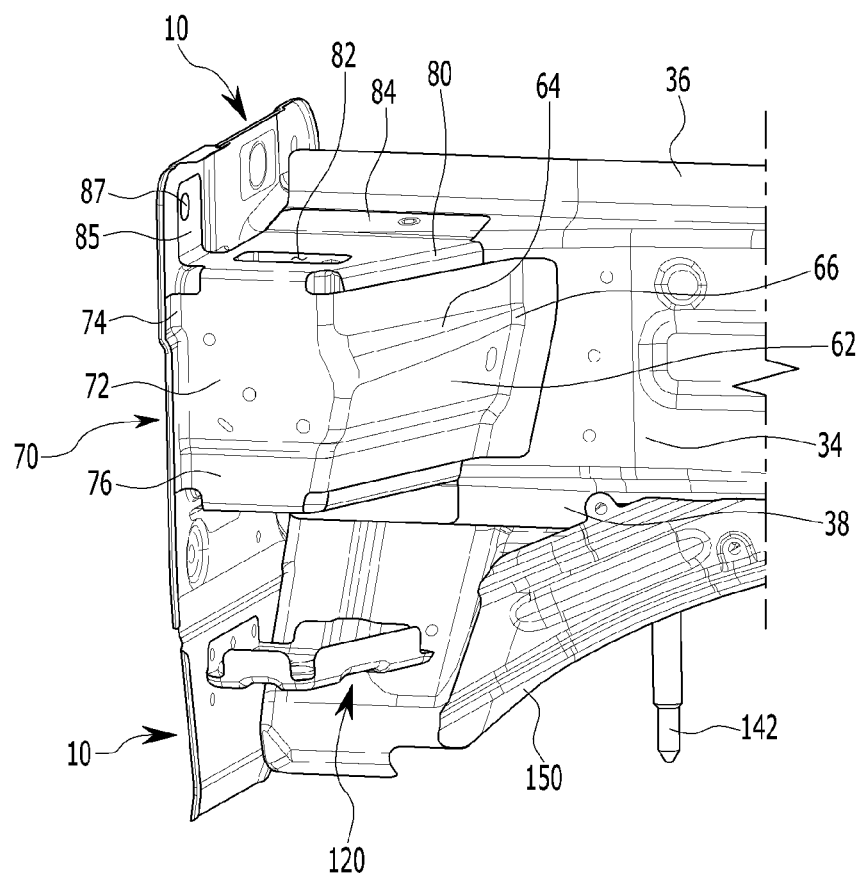
FIG. 7 is a partial perspective view excluding a lower bracket in FIG. 6.
Figure 8:
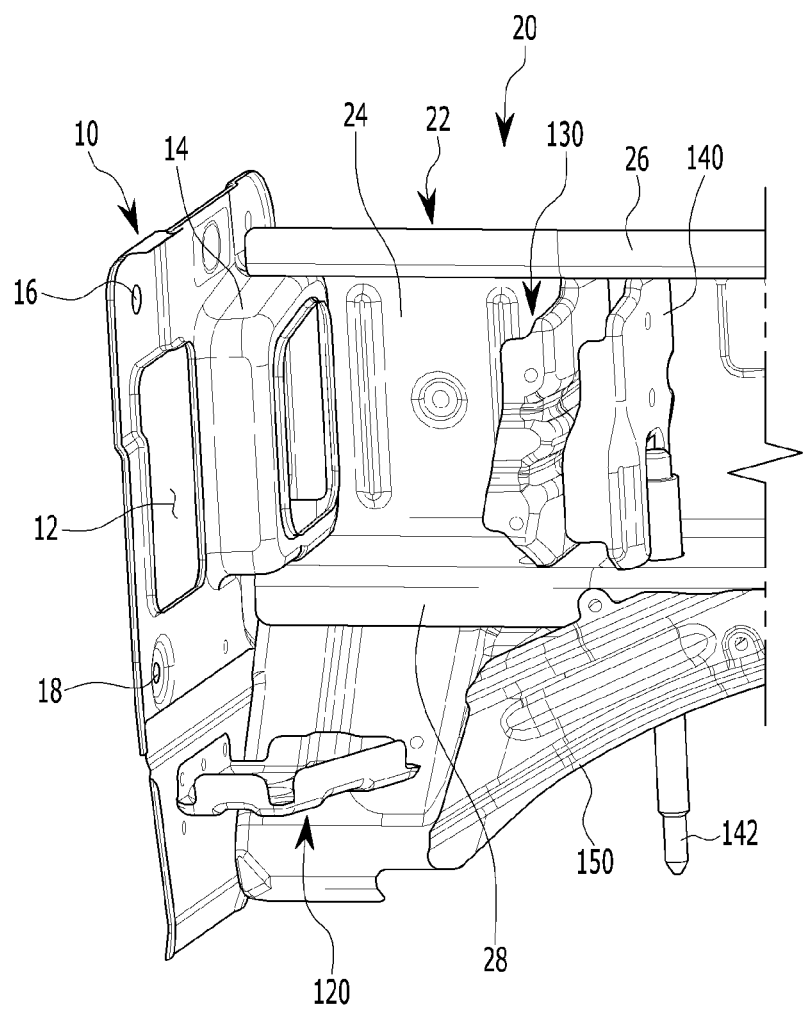
FIG. 8 is a partial perspective view excluding an upper bracket and a front side member second unit in FIG. 7.

FIG. 5 is a partial perspective view viewed from rear side of a front vehicle body structure according to an exemplary embodiment of the present disclosure excluding a front side upper outer member, and FIG. 6 is a partial perspective view in FIG. 5 excluding a front side upper inner member. FIG. 7 is a partial perspective view excluding a lower bracket in FIG. 6, and FIG. 8 is a partial perspective view excluding an upper bracket and a front side member second unit in FIG. 7.

The front mounting bracket 10 may include a front mounting bracket protrusion 14 protruded to engage the front side member 20. The front side member 20 may include a front side member first unit 22 having a front side member inner body 24 mating with the front mounting bracket protrusion 14 and an inner body upper flange 26 and inner body lower flange 28 curved in the upper and lower directions from the front side member inner body 24.

In addition, the front side member 20 may include a front side member second unit 32 having a front side member outer body 34 mating with the front mounting bracket protrusion 14 and an outer body upper flange 36 and an outer body lower flange 38 curved in the upper and lower directions from the front side member outer body 34. The outer body upper flange 36 and the outer body lower flange 38 may be welded to the inner body upper flange 26 and the inner body lower flange 28, respectively.

Further, connection direction of the outer body upper flange 36 and the outer body lower flange 38 and connection direction of the inner body upper flange 26 and the inner body lower flange 28 are formed along the longitudinal direction of the front side member 20. Accordingly, the rigidity of the front side member 20 in the longitudinal direction of the vehicle body may be increased.

The upper bracket 70 may include an upper bracket upper surface 80 formed in the vehicle body length direction and an upper bracket lower surface 90 formed under the upper bracket upper surface 80 in the vehicle body length direction. The upper bracket 70 may further include an upper bracket upper front flange 85 curved upwardly from the upper bracket upper surface 80 to engage the front mounting bracket 10 and the front flange 52.

An upper bracket upper front flange bolt hole 87 that corresponds to the front mounting bracket upper bolt hole 16 and the front flange upper bolt hole 54 may be formed in the upper bracket upper front flange 85. The upper bracket 70 may further include an upper bracket lower flange 92 curved downwardly from the upper bracket lower surface 90 and connected to the front mounting bracket 10.

A front mounting bracket lower bolt hole 18 may be formed in the lower portion of the front mounting bracket 10, and the upper bracket lower flange 92 may be disposed adjacent to the front mounting bracket lower bolt hole 18 and may be coupled to the front mounting bracket 10. Bracket bolts 172 join the bumper beam mounting bracket 170 and the front mounting bracket 10. In other words, the bracket bolt 172 may be inserted into the front mounting bracket upper bolt hole 16 and the front flange upper bolt hole 54 to combine the bumper beam mounting bracket 170, the front mounting bracket 10 and the front flange 52. In addition, the upper bracket upper front flange 85 may be disposed between the front mounting bracket 10 and the front flange 52 to increase the strength of the mount part with the bracket bolt 172.

Additionally, the bracket bolt 172 may be inserted into the front mounting bracket lower bolt hole 18 to connect the bumper beam mounting bracket 170, the front mounting bracket 10 and the front side member bracket 60. Welding holes 82 and 94 (referring to FIG. 8) may be formed in the upper bracket upper surface 80 and the upper bracket lower surface 90, respectively. A mounting bracket welding hole 12 that communicates with the welding holes 82, and 94 of the upper bracket 70 may be formed to the front mounting bracket 10. The upper bracket 70 may include a rear portion 62 coupled to the front side member 20, and the rear portion 62 may be inclined in a rear direction of the vehicle body.

The front side member bracket 60 may include a rear stepped portion 64 formed with a step difference in the rear portion 62. The curved shape of the rear stepped portion 64 may increase the strength of the rear portion 62 of the front side member bracket 60. The front side member bracket 60 may include a rear flange 66 that is curved in the rear portion 62 and coupled to the front side member 20. The front side member bracket 60 may be welded to the front side member 20 via the rear flange 66.

The upper bracket 70 may include an upper bracket side surface 72 connecting the front mounting bracket 10 and the rear portion 62. The upper bracket 70 may include an upper bracket side flange 74 curved from the upper bracket side surface 72 to engage the front mounting bracket 10, and an upper bracket upper flange 84 extending from the upper bracket upper surface 80 and coupled to the upper portion of the front side member 20. The upper bracket 70 may include a side surface stepped portion 76 that is formed in a step on the upper bracket side surface 72 and welded with the lower bracket 100 to be described later. The strength of the upper bracket side surface 72 may be secured by the stepped shape of the side surface stepped portion 76.

The upper bracket 70 may be welded in the width direction of the vehicle body to the front side member 20 through the rear flange 66, and to the front side member 20 in the height direction of the vehicle body through the upper bracket upper flange 84. Accordingly, the upper bracket 70 may be coupled to the front side member 20 in the width direction and height direction of the vehicle body, so that the coupling between the upper bracket 70 and the front side member 20 may be more robust.

The front side member bracket 60 may further include the lower bracket 100 connected to the front mounting bracket 10 and the lower part of the upper bracket 70. The lower bracket 100 may include a lower bracket side surface 110 connected to the front mounting bracket 10 and the upper bracket side surface 72, and a lower bracket rear surface 114 formed curved in the lower bracket side surface 110 and connected to the rear portion 62 and the front side member 20. The lower bracket 100 may further include a lower bracket front flange 112 formed curved in the lower bracket side surface 110 and connected to the front mounting bracket 10, and a lower bracket rear flange 116 curved in the lower bracket rear surface 114 and connected to the front side member 20.

The front vehicle body structure according to an exemplary embodiment of the present disclosure may further include a lower bracket bulk head 120 disposed inside the lower bracket 100 and the front mounting bracket 10. The front side upper member 40 may include a front side upper inner member 42 connected to the rear of the front mounting bracket 10 and connected to the upper bracket upper surface 80, and a front side upper outer member 46 (referring to FIG. 1, FIG. 2 and FIG. 4) connected to the front mounting bracket 10, surrounding the upper bracket 70, and mating with the front side upper inner member 42.

The front side upper member 40 may further include a connecting member 47 connecting the front side upper outer member 46 and the upper bracket 70, and the connection member 47 may increase the rigidity of the connection portion with the front mounting bracket 10. The front side upper member 40 may include a front side upper inner member upper flange 44 formed extending from the front side upper inner member 42 to the upper portion, and a front side upper outer member upper flange 48 that extends from the front side upper outer member 46 to an upper portion thereof and coupled to the front side upper inner member upper flange 44.

The front vehicle body structure according to an exemplary embodiment of the present disclosure may further include a front side bulk head 130 provided in the front side member 20 adjacent to the position where the rear portion 62 is coupled with the front side member 20. A wheel guard 150 may be provided at a lower portion of the front side member 20, and a sub frame mounting rear reinforcement 140 that supports the sub frame mounting bolt 142 may be provided inside of the front side member 20.

Figure 9:
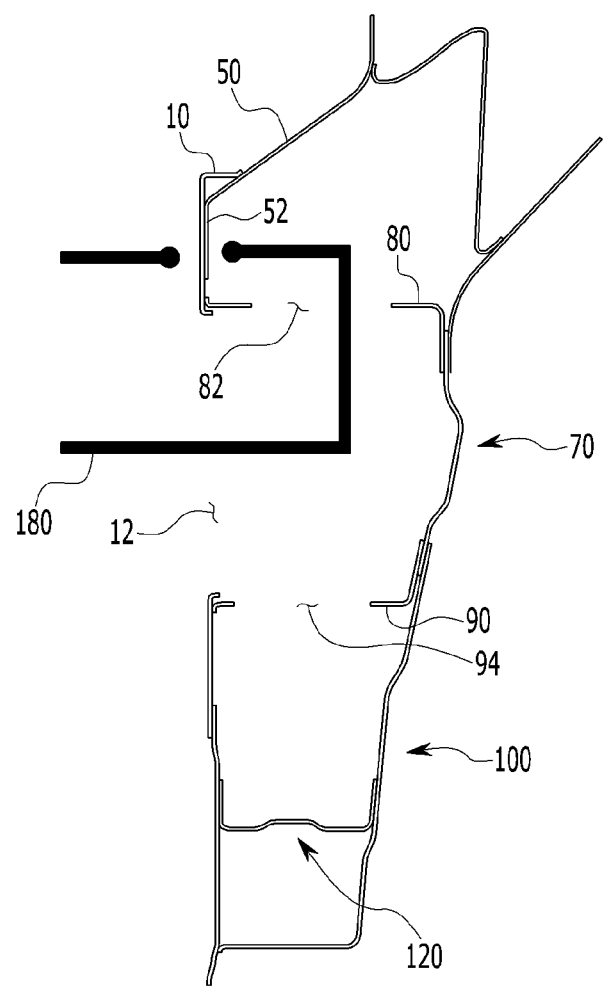
FIG. 9 is a cross-sectional view along the line IX-IX of FIG. 1.

FIG. 9 is a cross-sectional view along the line IX-IX of FIG. 1. Referring to FIG. 1 to FIG. 9, a welding gun 180 may be inserted and welded through the welding holes 82 and 94 of the upper bracket 70 and the mounting bracket welding hole 12. Accordingly, a welding operation between the front mounting bracket 10, the front side member bracket 60, and the front side upper member 40 may be easily performed.

As shown in FIG. 2, FIG. 3 and FIG. 9, the upper bracket upper surface 80 and the upper bracket lower surface 90 may be disposed adjacent to the mount portion of the bracket bolt 172. In other words, the upper bracket upper surface 80 and the upper bracket lower surface 90 may be formed in parallel with the cross-section of the crash box 162 to effectively transmit the crash load transmitted from the bumper beam 160 to the rear of the vehicle body during a front collision of the vehicle.

In addition, the front flange 52 may be bent downward from the upper member upper surface 50, and thus, the mount part of the bracket bolt 172 may be formed in the lower part of the upper member upper surface 50 of the front side upper member 40. Accordingly, the relative profile of the vehicle body height direction of the front side upper member 40 may be relatively long. In other words, it may be possible to additionally secure (H) the cross section in the height direction of the front flange 5, which secures a collision load path, thereby improving the response performance for a front collision.

Figure 10:
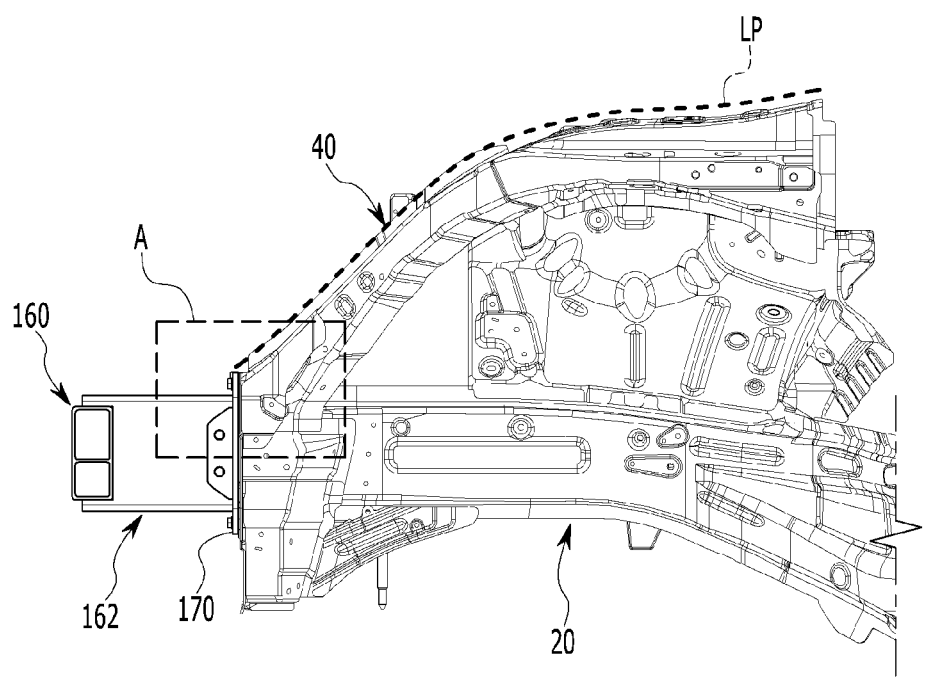
FIG. 10 is a side view of a front vehicle body structure according to an exemplary embodiment of the present disclosure.
Figure 11:
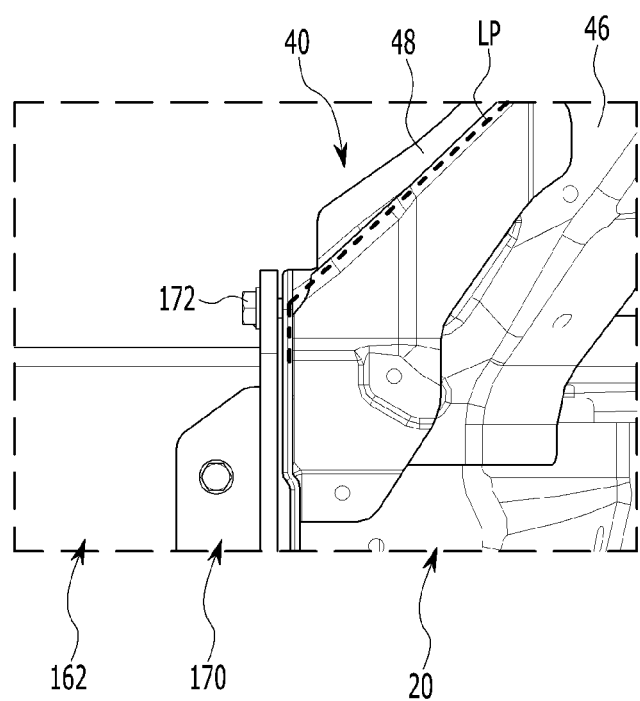
FIG. 11 is an enlarged view of part A of FIG. 10.

FIG. 10 is a side view of a front vehicle body structure according to an exemplary embodiment of the present disclosure, and FIG. 11 is an enlarged view of part A of FIG. 10. Referring to FIG. 1 to FIG. 10, since the mounting portion of the bracket bolt 172 is formed under the upper member upper surface 50 of the front side upper member 40, the deformation of the lateral profile of the front side upper member 40 may be minimized. Accordingly, the path of the collision load path LP of the front side upper member 40 may be simplified, to more easily distribute the collision load.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A front vehicle body structure, comprising:
   a front mounting bracket; and
   a front side upper member connected to the front mounting bracket;
   a front side member connected to the front mounting bracket;
   a front side member bracket connecting the front mounting bracket, the front side member, and the front side upper member; and
   a crash box mounted on a front of the front mounting bracket,
   wherein the front side member bracket includes:
      an upper bracket that connects the front mounting bracket and the front side member, wherein the upper bracket includes:
         an upper bracket upper surface formed in the vehicle body length direction; and
         an upper bracket lower surface formed under the upper bracket upper surface in the vehicle body length direction,
         wherein the upper bracket upper surface and the upper bracket lower surface are disposed adjacent to upper and lower mount positions of the crash box, and wherein the front side upper member includes:
  an upper member upper surface inclined upward and rearward of the vehicle body; and
  a front flange formed downward from the upper member upper surface and connected to the front mounting bracket.

2. The front vehicle body structure of claim 1, wherein:
a front mounting bracket upper bolt hole is formed in the upper part of the front mounting bracket; and
a front flange upper bolt hole corresponding to the front mounting bracket upper bolt hole is formed on the front flange.

3. The front vehicle body structure of claim 1, wherein the upper bracket further includes:
  an upper bracket upper front flange curved upwardly from the upper bracket upper surface to engage the front mounting bracket and the front flange.

4. The front vehicle body structure of claim 3, wherein an upper bracket upper front flange bolt hole corresponding to the front mounting bracket upper bolt hole and the front flange upper bolt hole is formed to the upper bracket upper front flange.

5. The front vehicle body structure of claim 1, wherein the upper bracket further includes:
  an upper bracket lower flange that is curved downward from the upper bracket lower surface and connected to the front mounting bracket.

6. The front vehicle body structure of claim 5, wherein:
a front mounting bracket lower bolt hole is formed in the lower part of the front mounting bracket, and
wherein the upper bracket lower flange is connected to the front mounting bracket adjacent the front mounting bracket lower bolt hole.

7. The front vehicle body structure of claim 1, wherein a welding hole is formed on the upper bracket upper surface and the upper bracket lower surface, respectively.

8. The front vehicle body structure of claim 7, wherein a mounting bracket welding hole that communicates with the welding holes of the upper bracket is formed to the front mounting bracket.

9. The front vehicle body structure of claim 1, wherein the front side member bracket further includes:
  a lower bracket connected to the front mounting bracket and lower part of the upper bracket.

10. The front vehicle body structure of claim 9, further comprising:
  a lower bracket bulk head mounted inside the lower bracket and the front mounting bracket.

11. The front vehicle body structure of claim 1, wherein the front side upper member includes:
  a front side upper inner member connected to the rear of the front mounting bracket and connected to the upper surface of the upper bracket; and
  a front side upper outer member connected to the front mounting bracket, surrounding the upper bracket, and coupled to the front side upper inner member.

12. The front vehicle body structure of claim 11, wherein the front side upper member includes:
  a front side upper inner member upper flange formed to extend from the front side upper inner member in an upward direction; and
  a front side upper outer member upper flange that extends from the front side upper outer member in the upward direction and coupled to the front side upper inner member upper flange.

13. The front vehicle body structure of claim 11, wherein the front side upper member includes:
  a connection member that connects the front side upper outer member and the upper bracket.

* * * * *